United States Patent [19]

Gerber

[11] Patent Number: 5,180,795
[45] Date of Patent: Jan. 19, 1993

[54] RETARDERS FOR HARDENING PHENOLIC RESINS

[75] Inventor: Arthur H. Gerber, Louisville, Ky.

[73] Assignee: Borden, Inc., Columbus, Ohio

[21] Appl. No.: 698,945

[22] Filed: May 13, 1991

Related U.S. Application Data

[63] Continuation-in-part of Ser. No. 562,206, Aug. 2, 1990, Pat. No. 5,096,983.

[51] Int. Cl.$^5$ ............... C08F 283/00; C08G 8/28; B22C 1/00
[52] U.S. Cl. ................... 525/504; 525/503; 525/505; 525/508; 523/139; 523/145; 523/146; 528/129
[58] Field of Search ............... 523/143, 145, 148, 144, 523/146, 466, 139, 145; 528/147, 129, 158.5, 161; 524/534; 525/503, 504, 505, 508

[56] References Cited

U.S. PATENT DOCUMENTS

| | | | |
|---|---|---|---|
| 2,869,191 | 1/1959 | Cooper et al. | 22/147 |
| 2,869,194 | 1/1959 | Cooper | 22/193 |
| 2,869,196 | 1/1959 | Cooper | 22/193 |
| 2,913,787 | 11/1959 | Cooper | 22/193 |
| 4,252,700 | 2/1981 | Funabiki et al. | 260/25 |
| 4,330,459 | 5/1983 | Takahashi et al. | 523/148 |
| 4,426,467 | 1/1984 | Quist et al. | 523/145 |
| 4,539,343 | 9/1985 | Nishimura | 523/145 |
| 4,794,051 | 12/1988 | Gupta | 428/524 |
| 4,831,067 | 5/1989 | Lemon et al. | 523/156 |
| 4,848,443 | 7/1989 | Westwood et al. | 528/158.5 |
| 4,961,795 | 10/1990 | Detlofsen et al. | 156/62.2 |
| 4,964,917 | 10/1990 | Bobrowski et al. | 106/804 |
| 5,015,529 | 5/1991 | Gupta | 428/414 |

FOREIGN PATENT DOCUMENTS

| | | |
|---|---|---|
| 0094165 | 11/1983 | European Pat. Off. |
| 6090251 | 5/1985 | Japan |
| 8901526 | 12/1989 | PCT Int'l Appl. |

Primary Examiner—John Kight, III
Assistant Examiner—Richard Jones
Attorney, Agent, or Firm—Kenneth P. Van Wyck; Dennis H. Rainear; George P. Maskas

[57] ABSTRACT

There is disclosed methods and compositions for retarding the room temperature hardening of phenolic resole resins when such resins are mixed with lightburned magnesium oxide with or without an ester functional hardening agent. Compounds which act as retarders include azelaic acid, salicylamide, sulfanilic acid, N-methylaniline, and 2,6-diethylaniline.

17 Claims, No Drawings

RETARDERS FOR HARDENING PHENOLIC RESINS

This application is a continuation-in-part of my copending application Ser. No. 07/562206 which was filed on August 2, 1990, now U.S. Pat. No. 4,096,983.

BACKGROUND OF THE INVENTION

My above mentioned patent application sets forth compounds which retard the hardening of phenolic resole resins admixed with hardening quantities of magnesium oxide or magnesium hydroxide, either alone or together with an ester functional hardening agent. This invention sets forth additional retarders. Thus, this invention relates to methods and compositions for retarding the hardening of phenolic resole resins which are hardened with magnesium oxide or magnesium hydroxide alone or together with an ester functional hardening agent. Such hardening can take place at about room temperature.

PRIOR ART

The use of magnesium oxide or magnesium hydroxide for the room temperature hardening of phenolic resole resins is well known and disclosed in references such as: U.S. Pat. No. 2,869,191 of Jan. 20, 1959; U.S. Pat. No. 2,869,194 of Jan. 20, 1959; U.S. Pat. No. 2,869,196 of Jan. 20, 1959; and U.S. Pat. No. 2,913,787 of Nov. 24, 1959, all of which were issued to R. H. Cooper.

U.S. Pat. No. 4,964,917 of Oct. 23, 1990; to G. S. Bobrowski et al. relates to a method for retarding the hydration of concrete by adding to the concrete a chelation agent for calcium. Such agents include certain phosphonic acids, citric or other hydroxycarboxylic acids. At the end of the retardation period, the retarded concrete is diluted with fresh concrete and then a hydration accelerating agent for the composition is added thereto. Accelerator hydration agents include various calcium salts, sodium thiocyanate, triethanolamine and glycolurils.

U.S. Pat. No. 4,539,343 of Sep. 3, 1985 to T. Nishimura recites the use of compounds having a pKa of less than 9.5 at 25° C. such as: salicylic acid, oxalic acid, malonic acid, and phosphoric acid together with a phenolic resin and magnesia clinker in order to to eliminate reddish color and improve flexural strength of refractory materials.

Japanese Kokkai Tokyo Koho JP 60/90251 of May 21, 1985 to Kyushu Refractories Co. Ltd. discloses the room temperature hardening of resole resins with magnesium oxide and ethylene carbonate.

U.S. Pat. No. 4,794,051 of Dec. 27, 1988 to M. K. Gupta discloses molding compositions comprising: (a) a phenolic resole resin; (b) a hardening agent of alkaline metal oxides or hydroxides e.g. magnesium oxide or magnesium hydroxide, and silanes; (c) a filler; (d) a lactone; and (e) a fiber reinforcement.

European Patent Application, Publication No. 0094165 of 16/11/83 to Lemon et al. discloses the use of phenolic resole resins which are hardened with ester functional hardening agents. In the recitation of alkaline agents for condensation of the phenol and formaldehyde, magnesium oxide is mentioned. This reference goes on to state that mixtures of alkalis can be used especially where one is used as a condensation catalyst and another to provide the remaining alkalinity to achieve the desired alkali to phenol molar ratio.

U.S. Pat. No. 4,831,067 of May 16, 1989 to Lemon et al. discloses the hardening of alkaline phenolic resole resins with an ester functional hardening agent. Alkalis recited as suitable are sodium hydroxide or potassium hydroxide or a mixture of these with alkaline earth oxides or hydroxides such as magnesium oxide, etc.

U.S. Pat. No. 4,961,795 to Detlefsen et al. which issued on Oct. 9, 1990 shows the use of aliphatic alcohols to moderate or retard the hardening of phenolic resole resins with ester functional hardening (curing) agents.

International Application No. PCT/GB89/01526 having an effective filing date of Dec. 21, 1989 to Lemon et al. discloses the preparation of phenolic resole resins with alkali or alkaline earth metal compounds as the basic catalyst and the subsequent room temperature hardening of such resins with an esterified phenolic resole as the ester functional hardening agent together with various bases, including oxides and hydroxides of magnesium and calcium.

SUMMARY OF THE INVENTION

It has now been found that the room temperature hardening of a phenolic resole resin admixed with lightburned magnesium oxide or magnesium hydroxide, either alone or together with an ester functional hardening agent, can be retarded with various compounds including: aniline, an aniline compound having not more than one N-alkyl group on the nitrogen together with not more than 2 alkyl groups on the phenolic ring wherein each alkyl has from 1 to 3 carbon atoms ; glyoxal; salicylic acid ; sulfanilic acid as well as its ortho- and meta- isomers-; catechol; azelaic acid; salicylamide and mixtures thereof.

In one aspect of the invention, binder compositions and methods for preparing binder compositions having an extended work life are provided by mixing the hardenable phenolic resole resin with the magnesium oxide or magnesium hydroxide alone or together with an ester functional hardening agent and a retarder and optionally a calcium containing hardening agent such as calcium oxide, calcium hydroxide, and calcined dolomite. The binder compositions are liquids or at least flowable at room temperature. Further, such methods and compositions can involve a room temperature hardening and/or a thermal cure. Mixing the flowable binder composition with an aggregate produces a raw batch composition.

In another aspect of this invention, methods and compositions are provided wherein a retarder is mixed with a phenolic resole resin, and lightburned magnesium oxide or magnesium hydroxide, with or without an ester functional hardening agent, in order to increase the working time, before substantial viscosity increase of resin occurs, and the mixture is then thermally cured.

Other aspects of this invention provide for polymeric concrete compositions, refractory articles, and coated abrasives.

Additional aspects of the invention include compositions involving various fillers, aggregates, shaped articles as well as binders having low sodium or potassium contents.

DETAILED DESCRIPTION OF THE INVENTION

Magnesium Oxide And Magnesium Hydroxide Hardening Agents

The term "hardening agent" is used herein to denote a material which increases the rate of hardening of a phenolic resole resin, e.g., at room temperature (R.T.) or at ambient temperature. Hardening is attained with increases in viscosity and gelation to form a solid which is firm to the touch and generally inflexible. The hardenable binder compositions of this invention which contain a phenolic resole resin, magnesium oxide or magnesium hydroxide hardener and optionally an ester functional hardening agent but without a retarder will generally be hard within about 24 hours on standing at 75° F. Although such hardening can also be referred to as "curing", the "hardening" or "curing" with hardening agents does not develop the tensile and flexural strengths of a thermal cure.

By the term "room temperature hardening" we mean the hardening of compositions of this invention at temperatures of about 60° F. to 90° F. particularly about 65° F. to 80° F. However, the use of retarders in the processes and compositions of this invention retard the hardening at lower and higher temperatures such as 60° F. to 120° F. In addition to room temperature hardening or hardening at ambient temperatures such as those of about 60° F. to 120° F., the compositions of this invention can be thermally cured after hardening by the hardening agents or the compositions can be thermally cured prior to such hardening. The term "thermal curing" as used herein means curing of the composition at a temperature of at least 170° F. (77° C.) and generally at a temperature of at least 212° F.

The magnesium hardening agents of this invention are magnesium hydroxide or lightburned magnesium oxide such as that having a surface area of from about 10 to 200 or more square meters per gram and preferably about 25 to 100 square meters per gram. The magnesium hydroxide hardening agent preferably has a surface area of about 10 to 50 square meters per gram.

Small quantities of calcium hydroxide, calcium oxide, or calcined dolomite (doloma) can also be added as hardening agents. However, the use of these calcium compounds alone or in high quantities together with the magnesium hardeners have serious shortcomings. Thus, these calcium compounds are highly basic and react too quickly, thus greatly reducing the mix working time. However, minor quantities, i.e., less than 50% by weight based on the weight of the magnesium hardening agent, of these calcium compounds, when mixed with the magnesium hardening agents, can be used to replace an equivalent weight of the magnesium hardening agents. Preferably such minor quantities do not exceed about one-forth of the total weight of the magnesium oxide.

Magnesia products having different surface areas can be obtained from the Martin Marietta Magnesia Specialties Company under the designator of MAGCHEM Magnesium Oxide Products. Illustratively, MAGCHEM 30 has a surface area of about 25 square meters per gram, MAGCHEM 50 has a surface area of about 65 square meters per gram whereas MAGCHEM 200D has a surface area of about 170 square meters per gram. One of the variables for viscosity increase, formation of gel and subsequent hardening of a phenolic resole resin is dependent on the surface area of the lightburned magnesium oxide. Magnesium oxides with the higher surface areas are more active and provide shorter times for gelation and hardening. Thus, lightburned magnesium oxide having a surface area of less than about 25 square meters per gram is slow acting and generally will not be used when it is desired to have the binder composition harden in a short time at temperatures below about 120° F. However, for some applications, such as for coated abrasives, it is desired that the magnesia be relatively slow acting and surface areas of about 10 to 25 square meters per gram are preferred. On the other hand, magnesia having a higher surface area, such as about 65 square meters per gram and above, will harden the same binder composition in a shorter period of time. Surface areas of less than about 25 square meters per gram will generally be used when it is desired to substantially prolong the open time or working time of the binder. Hardburned magnesia has a surface area of about one square meter per gram and reacts too slowly to be of practical value as a hardener whereas deadburned magnesia, also referred to as periclase, has a surface area of less than one meter per gram and is sufficiently inert so that it is used conventionally as a refractory with phenolic resin binders with little effect on room temperature hardening rates.

The quantity of lightburned magnesium oxide or magnesium hydroxide which is used in this invention as a hardener is an amount sufficient to increase the rate of gelation or hardening of the phenolic resole resin. This quantity can vary over a wide range. The quantity of the magnesium hardener used will vary depending on whether or not an ester hardening agent is also used in the composition, the surface area of the magnesium oxide, the specific ester hardening agent, the quantity of magnesium and ester hardening agent, the temperature, and the desired result, Thus, the magnesium hardening agent will generally vary from about 2% to 40% by weight of the resin and particularly from about 5% to 35% by weight of the resin. When the magnesium hardening agent is used without the ester hardener, it is preferred that from about 10% to 40% by weight based on the weight of the resin be used and particularly 15% to 30% by weight based on the weight of the resin. When the magnesium hardening agent is used together with an ester functional hardening agent, it is preferred that the quantity of magnesium oxide or magnesium hydroxide vary from about 2% to 30% by weight of the resin and particularly from about 5% to 20%. The preferred magnesium hardening agent is lightburned magnesium oxide since the magnesium hydroxide is a slower hardening agent.

The Ester Hardening Agent

The ester functional hardening agent accelerates the hardening of the resole when used with the magnesium hardener while at the same time use of both magnesium hardening agent and ester hardening agent mixed with the resole resin provide a hardening system which is very sensitive to small quantities of the retarders. However mixtures of phenolic resole resins used in this invention and an ester functional hardening agent, in the absence of magnesia or other added alkali, will not harden at 70 F for several days or longer.

The ester functionality for hardening of the phenolic resole resin can be provided by lactones, cyclic organic carbonates, carboxylic acid esters, or mixtures thereof. Generally, low molecular weight lactones are suitable as the ester functional hardening agent, e.g. beta or gamma-butyrolactone, gamma-valerolactone, caprolactone, beta-propiolactone, beta-butyrolactone, beta-isobutyrolactone, beta-isopentyllactone, gamma-isopentyllactone, and delta-pentyllacton cyclic organic carbonates include, but are not limited to: propylene carbonate; ethylene carbonate; 1,3-butanediol carbonate; 1,2-pentanediol carbonate; and 1,3-pentanediol carbonate.

The carboxylic acid esters which can be used in this invention include phenolic esters and aliphatic esters. The aliphatic esters are preferably those of short or medium length, e.g., about 1 to 10 carbon mono- or polyhydric, saturataed or unsaturated alcohols with short or medium chain length, e.g., about 1 to 10 carbon aliphatic, saturated or unsaturated carboxylic acids which can be mono- or polycarboxylic. The preferred aliphatic esters are those of alkyl, mono-, di-, or trihydric alcohols with alkyl, or mono-, or diunsaturated acids which can be mono, di-, or tricarboxylic.

As to aromatic esters, such esters can be obtained by esterifying the aromatic, e.g., phenolic group or groups of a mono- or polyhydric aromatic phenol to prepare a formate or acetate ester of such aromatic compound. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxy group. Such phenolic esters and their method of manufacture are disclosed in International Application No. PCT/GB89/01526 having a filing date of Dec. 21, 1989 to Lemon et al.

It will be understood that the esterified phenolic compound used may be a mono-, di- or polynuclear phenol wherein at least one esterified methylol group is attached to an aromatic ring carbon atom ortho or para to a phenolic hydroxyl group or esterified phenolic hydroxyl group. The acid portion of the phenolic esters can be the same as those of the aliphatic esters.

Specific carboxylic acid esters include but are not limited to: D-butyl formate; ethylene glycol diformate; methyl and ethyl lactates; hydroxyethyl acrylate; ethylene glycol diacetate; triacetin (glycerol triacetate); diethyl fumarate; dimethyl maleate; dimethyl glutarate; dimethyl adipate; 2-acetyloxymethyl phenol; 2-methacryloxymethyl phenol; 2-salicyloxylmethyl phenol; 2-acetyloxymethyl phenol acetate; 2,6-diacetyloxymethy p-cresol acetate; 2,4,6- triacetyloxymethyl phenol; 2,4,6-triacetyloxymethyl phenol acetate; 2,6-diacetyloxymethyl phenol acetate; 2,2',6,6'-tetraacetyloxymethyl bisphenol A; and 2,2',6,6'-tetraacetyloxymethyl bisphenol A diacetate. Also suitable are: cyanoacetates derived from 1 to 5 carbon atom aliphatic alcohols; formates and acetates of benzyl alcohol, alpha,alpha'-dihydroxyxylenols, phenol, alkyl substituted phenols, dihydroxybenzenes, bisphenol A, bisphenol F , and low molecular weight resoles. At times, it is advantageous to use mixtures of the ester functional hardening agents.

Gaseous esters, such as methyl and ethyl formates, can be used as ester functional hardening agents in low density articles or when applying the binders to fabric or paper substrates. When gaseous esters are used as hardening agents, the ester is generally not mixed with the resin binder and aggregate but rather is supplied as a gas to the shaped article as is well known in the art.

The ester functional hardening agent is present in an amount sufficient to increase the tensile and compressive strength of the hardened composition. Such quantity of the ester also increases the rate of hardening of the phenolic resole resin in the presence of the magnesium hardener. This increase in rate is evident both with and without the use of a retarder. Furthermore, for room temperature hardening, the magnesium hardens the resin through ionic bonding. In contact with a weak acid the hardened composition held together only with ionic bonding will lose strength. Whereas the use of an ester provides covalent bonds in addition to the ionic bonds of the magnesium hardener. The covalent bonds provided by the ester are not affected or at least much less affected by weak acids. The quantity of ester will vary over a broad range such as that of about 5% to 40% by weight of the phenolic resole resin and preferably from about 10% to 25% by weight of the resin. As with said magnesium hardening agent, the exact quantity will depend on the particular ester hardener used, the amount and specific magnesium hardener used, the temperature at which the composition is used or stored, and desired results.

The Phenolic Resole Resin

A broad range of phenolic resole resins may be used in this invention. These can be phenol formaldehyde resole resins or those wherein phenol is partially or completely substituted by one or more phenolic compounds such as cresol, resorcinol, 3,5-xylenol, bisphenol-A , or other substituted phenols and the aldehyde portion can be partially replaced by acetaldehyde, furaldehyde or benzaldehyde. The preferred phenolic resole resin is the condensation product of phenol and formaldehyde. Resole resins are thermosetting, i.e., they form an infusible three dimensional polymer upon application of heat and are produced by the reaction of a phenol and a molar excess of a phenol-reactive aldehyde typically in the presence of an alkali or alkaline earth metal compound as condensing catalyst. Preferred phenolic resole resins used in this invention have less than about 1% and preferably not more than 0.5% by weight of water soluble sodium or potassium from an ion source. Typically, the resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2. The phenolic resole resin will usually be used in aqueous solution.

The pH of the phenolic resole resin used in this invention will generally vary from about 4.5 to 9 or 9.5 with a pH of 5 to 8.5 being preferred. Free phenol will typically be 2% to about 25% by weight of the resin with preferred levels being 5% to about 12%. The molecular weight of the resin will vary from about 200 to 5,000 weight average molecular weight with 300 to about 2,000 being preferred. All other things being equal, higher molecular weights and lower free-phenol will provide shorter gel or hardening time and increase strength development. The weight average molecular weight (Mw) is measured using gel permeation chromatography and phenolic compounds and polystyrene standards. The sample molecular weight to be measured is prepared as follows: the resin sample is dissolved in tetrahydrofuran and slightly acidified with 1N hydrochloric or sulfuric acid and dried over anhydrous sodium sulfate. The salts which result are removed by filtration and the supernatant liquid run through a gel permeation chromatograph.

The resin solids in the resole resin can vary over a broad range such as that of about 50% to 90% by weight of the phenolic resole resin. Preferably, the resin solids vary from about 50% to 80% by weight of the phenolic resole resin. The viscosity of the resin, can vary over a broad range such as that of about 100 to 4,000 cps at 25° C. Preferably, the viscosity varies from about 200 to 3,000 cps at 25° C. and particularly from about 250 to 2,000 cps at 25° C. The viscosity measurements herein are given in centipoises (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps at 25° C.

The quantity of resin based on aggregate, when aggregate is used for the raw batch compositions, can vary over a broad range, preferably from about 3% to 20% by weight of resin based on the weight of aggregate and particularly from about 5% to 15% of resin based on the weight of aggregate.

The liquid portion of the resin is water or water together with a non-reactive solvent. The resin can include a number of additional modifiers or additives such as silanes, hexamethylene tetraamine, or urea. Solvents in addition to water can be selected from alcohols of one to five carbon atoms, diacetone alcohol, glycols of 2 to 6 carbon atoms, mono- and dimethyl or butyl ethers of glycols, low molecular weight (200-600) polyethylene glycols and methyl ethers thereof, phenolics of 6 to 15 carbons, phenoxyethanol, aprotic solvents, e.g., N,N-dimethylformamide, N,N-dimethylacetamide, 2-pyrrolidinone, dimethyl sulfoxide, tetramethylene sulfone, hexamethylphosphoramide, tetramethyl urea, methyl ethyl ketone, methyl isobutyl ketone, cyclic ethers such as tetrahydrofuran and m-dioxolane, and the like. Typical water contents for the resins used in this invention will vary from about 5% to 20% by weight of the resin.

Organofunctional silane adhesion promoters, such as gamma-aminopropyl triethoxysilane or 3-glycidoxypropyltrimethoxy silane which can be used in amounts of up to about 0.05% to 1% by weight, based on the weight of resin, are recommended for use when compositions of this invention include siliceous aggregates, such as silica sands, crushed rock, silicates, and alumina based aggregates.

The Retarders

Retarders used in this invention include: azelaic acid; salicylamide; glyoxal; salicylic acid; sulfanilic acid (p-aniline sulfonic acid); m-aniline sulfonic acid; o-aniline sulfonic acid; aniline; substituted aniline having up to one N- alkyl substituent and up to 2 alkyl substituents on the aromatic ring wherein each alkyl has from 1 to 3 carbon atoms, e.g. 2,6-dimethylaniline; 2,6-diethylaniline; 2,6-diisopropylaniline; 3,5-diethylaninline, N-methylaniline, N-ethyl-2-methylaniline, N-ethyl- 3,5-dimethylaniline; p-methylaniline; catechol; as well as salts of the acidic or basic retarders to the extent that the salt forming agent is not one which causes the retarder to lose its retarder activity such as in the case of a compound which acts to accelerate the hardening of the resin to the extent that the salt which is formed loses its activity as a retarder. My copending U.S. patent application Ser. No. 07/616879 which was filed on Nov. 21, 1990, which is incorporated herein by reference, discloses accelerators for hardening phenolic resole resins. Basic addition salts of acidic retarders such as salicylic acid are preferably those of amino, ammonium, and alkylammonium compounds.

Use of a retarder provides added working time and mix life for the resin-hardener mixture while retaining adequate strength development. Due to the longer mix and working time provided by the retarder, the hardened mixture often has less voids and greater ultimate strength.

The quantity of retarder used in this invention is an amount or quantity sufficient to slow the rate of viscosity increase, gelation or hardening of the resin, magnesium hardener and optionally ester hardener. Such quantity can vary over a wide range depending on the activity of the particular retarder, the amount of retardation desired, the room or ambient temperature, and the type and quantity of magnesium or magnesium and ester hardening agents. The minimum quantity of retarder is generally about 0.1% based on the weight of the resin and preferably at least 0.5%. Generally, the quantity of the retarder is maintained to no more than about 10% based on the weight of the resin and preferably not more than about 5%. Preferred quantities of the retarder are from about 0.5% to 5% by weight of the phenolic resole resin.

Fillers, Aggregates and Modifiers

The compositions of this invention can include fillers, modifiers, and aggregates which are conventionally used with phenolic resole resins. The aggregate material may be a particulate material such as that in granular, powder, or flake form. Suitable aggregate materials include but are not limited to: magnesite, alumina, zirconia, silica, zircon sand, olivine sand, silicon carbide, silicon nitride, boron nitride, bauxite, quartz, chromite, and corundum and mixtures thereof. For certain applications, low density aggregate materials such as vermiculite, perlite, and pumice are preferred. For other applications, preferable high density aggregates include: limestone, quartz sand, gravel, crushed rock, broken brick and air cooled blast furnace slag. Sand, gravel, and crushed rock are preferred aggregates in polymeric concrete.

Fillers such as calcium carbonate, kaolin, mica, wollastonite, and barites can be used in quantities of up to about 50% by weight of the formulated resin product. The quantity of such fillers can equal the quantity of the resin. Hollow microspheres of glass, phenolic resin, or ceramic can also be used in quantities of up to about 20% of the formulated resin product. Other optional modifiers, particularly in polymer concrete, include fibers such as steel, alkali resistant glass, polyester, carbon, silicon carbide, asbestos, wollastonite fibers, and aromatic polyamides such as KELVAR aramid fiber, which is a trade mark of the DuPont company, and polypropylene. The quantity of such fibers can vary over a wide range sufficient to improve the strength of the composition. When aggregate is used, the quantity of fiber will generally vary from about 2% to 5% by weight of aggregate.

The raw batch compositions produced by combining the hardenable resin binder, aggregate, hardening agent or agents and retarder may additionally comprise any of a number of optional modifiers or additives including non-reactive solvents, silanes, hexamethylenetetraamine, clays, graphite, iron oxide, carbon pitch, silicon dioxide, metal powders such as aluminum, magnesium, silicon, surfactants, dispersants, air detraining agents, and mixtures thereof. Air detraining agents such as antifoamers, e.g., dimethylpolysiloxane and the like, can be employed in an amount sufficient to increase the strength of the composition. Such quantities can vary over a broad range such as from about 0.005% to 0.1% based on the weight of resin and preferably from about 0.01% to 0.05% based on the weight of resin. Illustrative of additional air detraining agents there can be mentioned: various acetylenic derivatives such as the SURFYNOLS of Air Products and Chemicals, Inc. e.g. SURFYNOL DF-110L, SURFYNOL 104, and SURFYNOL GA; and various siloxanes such as dimethylpolysiloxane and dimethylsiloxane-alkylene oxide copolymers such as PS073 which is supplied by Hüls Petrarch Systems.

In foundry applications and sand-binder overlays, or where silica sand is used as the aggregate, a preferred additive is a silane adhesion promoter, such as gamma-aminopropyltriethoxysilane or 3-glycidoxypropyltrimethoxy silane. In refractory applications, clays, metal powders (e.g. aluminum, magnesium, or silicon), and graphite are preferred additives. When graphite or metal powders of aluminum, magnesium, or silicon or mixtures thereof are used as additives, the amount of aggregate, such as alumina or magnesia, can be reduced to as low as about 70% by weight of the composition.

Applications

The methods and compositions of this invention are particularly useful in: preparing shaped articles such as bonding refractory aggregate for the manufacture of bricks and castable monolithic shapes; polymer concrete, also referred to as resin-filled aggregate, for repair or protective overlay for concrete to provide resistance to acids, oils and organic solvents as well as the manufacture of precast shapes such as pipe, tile, wall panel, and the like, where hydrolytic, solvent, acid and heat resistance are desirable; and impregnated paper for use as auto oil and air filters. Furthermore, the binder compositions of this invention are suitable for bonding abrasive grits such as for use in coated and bonded abrasives.

Refractory shaped articles include refractory brick and monolithic refractories. The conventional refractory compositions contain: a hardenable phenolic resole resin; magnesium hardening agent; aggregate; metal powders and graphite. Aggregates normally used for refractories are: magnesia (periclase); alumina; zirconia; silica; silicon carbide; silicon nitride; boron nitride; bauxite; quartz; corundum; zircon sand; olivine sand; and mixtures thereof. Preferred aggregates for refractory use are: refractory magnesia (periclase); alumina; and silica. The amount of graphite generally varies from about 5% to 25% by weight of the refractory aggregate and the quantity of metal powder such as aluminum, magnesium, and silicon will generally vary from about 1% to 5% by weight of refractory aggregate.

In the case of refractories such as brick, the refractory composition is pressed into the desired shape and then thermally cured. At times, there is a delay after preparing the composition and before pressing it into the desired shapes with subsequent thermal curing such as at temperatures of about 230° F. (110° C.). Such delay can be of a few minutes or it can last over a period of a day or two. During such delay, the binder composition will increase in viscosity and become drier. Subsequent pressing of such binder into a shaped article such as brick and thermal curing produces articles having diminished strengths and/or which require more pressure cycles to compact to the desired density. The addition of a retarder slows the viscosity increase and provides pressed and thermally cured articles with greater ultimate tensile strength.

In some refractory applications, prefabricated forms, other than brick-like shapes, are required. These "monolithic refractories" are cast by placing a liquid flowable binder-aggregate system into a mold and then filling out the mold by using vibration. Once the binder-aggregate system is room temperature hardened, the mold is stripped away so that the shape can be thermally cured and readied for use, either before or after transporting the monolithic refractory to its place of use. The retarders of the present invention provide increase working time for filling out the mold and compaction of the composition. After room temperature hardening, the monolithic can be thermally cured or carbonized, preferably at the site of use such as part of a furnace lining. Carbonizing takes place at a temperature above 800° C. or 1,000° C.

Polymer concrete is formed by polymerizing a monomer, resin, or mixture thereof in the presence of an aggregate. The binder compositions of this invention are particularly advantageous for this use since the retarder provides extended troweling or working time, the lack of high alkalinity and high sodium or potassium ion levels does not affect the aggregate and the composition can cure at room or ambient temperature in a reasonable time indoors or outdoors.

As mentioned hereinabove, the binder compositions of this invention are also advantageous for use in the manufacture of coated abrasives. A primary reason for this is that the retarder provides extended shelf life to the completely formulated mixture. This cuts down on the number of resin formulated mixtures which need to be prepared. Working and storage time is limited in the absence of a retarder and during such working and storage time the viscosity increase of the resin impairs reproducibility of the coating thickness and strength of adhesive bond to the abrasive particles and backing material.

In order that those skilled in the art may more fully understand the invention presented herein, the following procedures and examples are set forth. All parts and percentages in the examples, as well as elsewhere in this application, are by weight.

Procedure For Gel Determination

A screw cap glass vial (28×95mm) is charged with: 6.0 grams (g) of Resin A; additives if any, as indicated in Table 1; 0.5 grams water; and 1.5 grams of gamma ($\gamma$) butyrolactone. The solution is mixed well prior to addition of 0.75g of lightburned magnesia having a surface area of 65 square meters per gram. The mixture is thoroughly mixed for one minute using a S/P Vortex Mixer of American Scientific Products at a setting of 9. Five grams of this mixture is immediately transferred to a glass test tube (18×155mm). A glass rod with a magnetized head fitting is introduced into the mixture and fitted to a Sunshine Gel Time Meter which is then turned on. The tube is immersed in a 25° C. water bath throughout the test. The time of gelation is signified when the magnetized head stops turning and also by the sounding of an audible signal.

Phenolic Resole Properties

Phenolic Resole Resin A, or simply Resin A, is a phenol formaldehyde resole resin prepared by reacting phenol (P) with 50% formaldehyde (F) at a F/P molar ratio of 1.25 using sodium hydroxide as catalyst to prepare a resin intermediate. This resin intermediate is formulated with acetic acid, ethanol, methanol and N,N-dimethylformamide (DMF) to provide Resin A which, when fresh, had: a viscosity at 25° C. of 1700 centistokes,( approximately 2050 cps at 25° C.) for the first batch and 1930 centistokes at 25° C. about 2300 cps at 25° C.)for the second batch; 7% free phenol; 10% lower alkyl alcohols; 12% water; 4% DMF; a pH of 5.9, and a weight average molecular weight of about 2670 for the first batch and about 3,000 for the second.

Gel Tests

In these tests, various additives were tested at the concentration indicated in parenthesis adjacent to the name of the additive in the following Table 1, based on resin weight (B.O.R.), for their effect on the rate of hardening of the phenolic resole resin in the presence of both magnesium oxide hardener and the ester hardener at 25° C. The rate of hardening was determined by measuring time of gelation in accordance with the hereinabove procedure entitled "Procedure For Gel Determination". The resin employed was Resin A. The ester was γ-butyrolactone, and the magnesium hardener was MAGCHEM 50. The controls for Table 1 were the composition without additive. Differences in control (Mixes 1, 4, 13, 16, and 21 ) gel times are due to either different plant batch intermediates used to formulate Resin A and/or different cold storage times of the resin before use. The tests are grouped so that: Mixes 1-3 used the same identical resin as control Mix which had a weight average molecular weight of 3000 and a viscosity of 1930 centistokes at 25° C. ; Mixes 4-12 used the same identical resin as control Mix 4 which had a weight average molecular weight of 2600 and a viscosity of 1700 cetistokes at 25° C.; Mixes 13-15 used the same identical resin as control Mix 13 which was the same as that of mix 4 except that Mix 13 had been placed in cold storage for about 2 month; Mixes 16 to 20 used the same identical resin as control Mix 16 which was the same as that of Mix 4; whereas Mixes 21-24 used the identical resin as control Mix 21 which is Resin A as in Mix 4 but after 3 months cold storage.

Results in Table 1, below, show that: sulfanilic acid is a very good retarder; glyoxal, 2,6-diethylaniline (at 6.5% B.O.R.), catechol and salicylic acid are good retarders; and 2-chlorophenol, salicylamide, and azelaic acid are modest retarders. Interestingly, azelaic acid which is a linear C9 diacid is a retarder whereas adipic acid, a linear C6 diacid, if anything, acts as a modest accelerator. A number of the other additives function as marginal retarders.

TABLE 1

Effect of Additives on Gel Time of Resin A/γ-Butyrolactone/Magnesia

| System: | 6.0 g Resin A<br>0.5 g Water<br>1.5 g γ-Butyrolactone | 0.75 g Lightburned magnesia having surface area of 65 square meters per gram |
|---|---|---|

| Mix | Additive (% on Resin) | Gel Time, Minutes, 25° C. |
|---|---|---|
| 1 | None | 67 |
| 2 | Benzene sulfonamide (4%) | 73 |
| 3 | Ketjenflex 8ª (4%) | 63 |
| 4 | None | 77 |
| 5 | 2,2'-Biphenol (3%) | 92 |
| 6 | 2-Chlorophenol (3%) | 100 |
| 7 | Catechol (3%) | 119 |
| 8 | Salicylamide (3%) | 102 |
| 9 | 1-Naphthol (3%) | 93 |
| 10 | Methyl anthranilate (2%) | 80 |
| 11 | Sulfanilamide (2%) | 88 |
| 12 | Sulfanilic acid (2%) | 164 |
| 13 | None | 70 |
| 14 | Glyoxal (3.1%) | 121 |
| 15 | 2,6-Diethylaniline (6.5%) | 120 |
| 16 | None | 77 |
| 17 | Azelaic acid (2%) | 101 |
| 18 | Adipic acid (2%) | 56 |
| 19 | Gluconic acid (2%) | 50 |
| 20 | Salicylic acid (2%) | 110 |
| 21 | None | 63 |
| 22 | N-methylaniline (2%) | 80 |
| 23 | N-methylaniline (4%) | 120 |
| 24 | Aniline (2%) | 85 |

In the above Table 1: (a) is a trademark for a mixture of o and p-N-ethyl p-toluene sulfonamides of Akzo Chemical.

Similar results as those shown in Table 1 can be obtained by substituting the same quantity of other esters in place of that used in Table 1, e.g. by the use of caprolactam, ethylene carbonate, methyl lactate, glycerol triacetate, and the like.

Gel Tests 2

Using the procedures and compositions of the above "Gel Tests" and Table 1, but omitting the ester so that the sole hardener is the ligthtburned magnesia, such compositions will show retardation of hardening with the retarder additives such as sulfanilic acid, catechol, glyoxal, salicylic acid, and 2,6-diethylaniline. Similar results can be obtained by using magnesium hydroxide with an ester functional hardening agent.

In order to increase the strength of the hardened compositions, the compositions should be prepared by: adding the lightburned magnesia last in the mixture to be hardened; and generally diluting the resin with water,e.g. in the case of Resin A adding about 10% of water by weight of the resin. Further strength of the hardened composition is increased when thermal cure is initiated at a temperature below 100° such as 80° C.

What is claimed is:

1. A binder composition comprising a mixture of:
   a. a phenolic resole resin having a pH of about 4.5 to 9, a resin solids content of about 50% to 90% by weight of said resin, and a viscosity of about 100 to 4,000 cps at 25° C.;
   b. a magnesium hardening agent selected from the group consisting of magnesium hydroxide and lightburned magnesium oxide the amount of magnesium hardening agent being sufficient to accelerate the hardening of said resin, said lightburned magnesium oxide having a surface area of about 10 to 200 square meters per gram;

c. a retarder selected from the group consisting of: aniline; a substituted aniline having up to one N-alkyl group and up to 2 alkyl groups on the aromatic ring wherein each alkyl group has from 1 to 3 carbon atoms; salicylamide; sulfanilic acid; m-aniline sulfonic acid; and o-aniline sulfonic acid, said retarder being in a quantity sufficient to retard the hardening of the mixture; and d. from about 5% to 40% by weight of the resin of an ester functional hardening agent selected from the group consisting of a lactone, a carboxylic acid ester, a cyclic organic carbonate, and mixtures thereof.

2. The composition of claim 1 wherein the quantity of ester is from about 10% to 25% by weight of the resin.

3. The binder composition of claim 1 wherein the magnesium hardening agent is lightburned magnesium oxide.

4. The composition of claim 3 wherein:

a. the resin has a pH of about 5 to 9, a solids content of about 50% to 80% by weight of the resin and a viscosity of about 250 to 3,000 cps at 25° C.;

b. the quantity of lightburned magnesium oxide is from about 5% to 20% by weight of the resin and the surface area of said oxide is from about 25 to 100 square meters per gram; and c. the quantity of the retarder varies from about 0.5% to 5% based on the weight of the resin.

5. The composition of claim 4 wherein the ester functional hardening agent is a lactone.

6. The composition of claim 5 wherein the lactone is gammabutyrolactone.

7. The composition of claim 3 wherein the retarder is sulfanilic acid.

8. The composition of claim 3 wherein the retarder is 2,6-diethylaniline.

9. The composition of claim 3 wherein the quantity of magnesium oxide is from 2% to 30% by weight of the resin.

10. A binder composition comprising a mixture of:

a. a phenol formaldehyde resole resin having a pH of about 4.5 to 9, a resin solids content of about 50% to 90% by weight of said resin, and a viscosity of about 100 to 4,000 cps at 25° C.;

b. about 2% to 30% of lightburned magnesium oxide, based on the weight of resin, said oxide having a surface area of about 10 to 200 square meters per gram;

c. a retarder selected from the group consisting of: aniline; a substituted aniline having up to one N-alkyl group and up to 2 alkyl groups on the aromatic ring wherein each alkyl group has from 1 to 3 carbon atoms; salicylamide; sulfanilic acid; m-aniline sulfonic acid; and o-aniline sulfonic acid, said retarder being in a quantity sufficient to retard the hardening of the mixture;

d. from about 5% to 40%, by weight of the resin, of an ester functional hardening agent selected from the group consisting of a lactone, a carboxylic acid ester, a cyclic organic carbonate, and mixtures thereof.

11. The composition of claim 10 wherein the quantity of magnesium oxide is from 5% to 20%.

12. The composition of claim 10 wherein the retarder is sulfanilic acid.

13. The composition of claim 10 wherein the retarder is 2,6-diethylaniline.

14. The composition of claim 10 wherein:

a. the resin has a pH of about 5 to 9, a solids content of about 50% to 80% by weight of the resin and a viscosity of about 250 to 3,000 cps at 25° C;

b. the quantity of lightburned magnesium oxide is from about 5% to 20% and the surface area of said oxide is from about 25 to 100 square meters per gram; and c. the quantity of the retarder varies from about 0.5% to 5% based on the weight of the resin.

15. The composition of claim 14 wherein the retarder is sulfanilic acid.

16. The composition of claim 14 wherein the retarder is 2,6-diethylaniline.

17. The composition of claim 14 wherein the ester functional hardening agent is a carboxylic acid ester.

* * * * *